Sept. 22, 1936.　　　I. HERSHBAIN　　　2,055,149
BICYCLE LOCK
Filed July 9, 1935　　　2 Sheets-Sheet 1
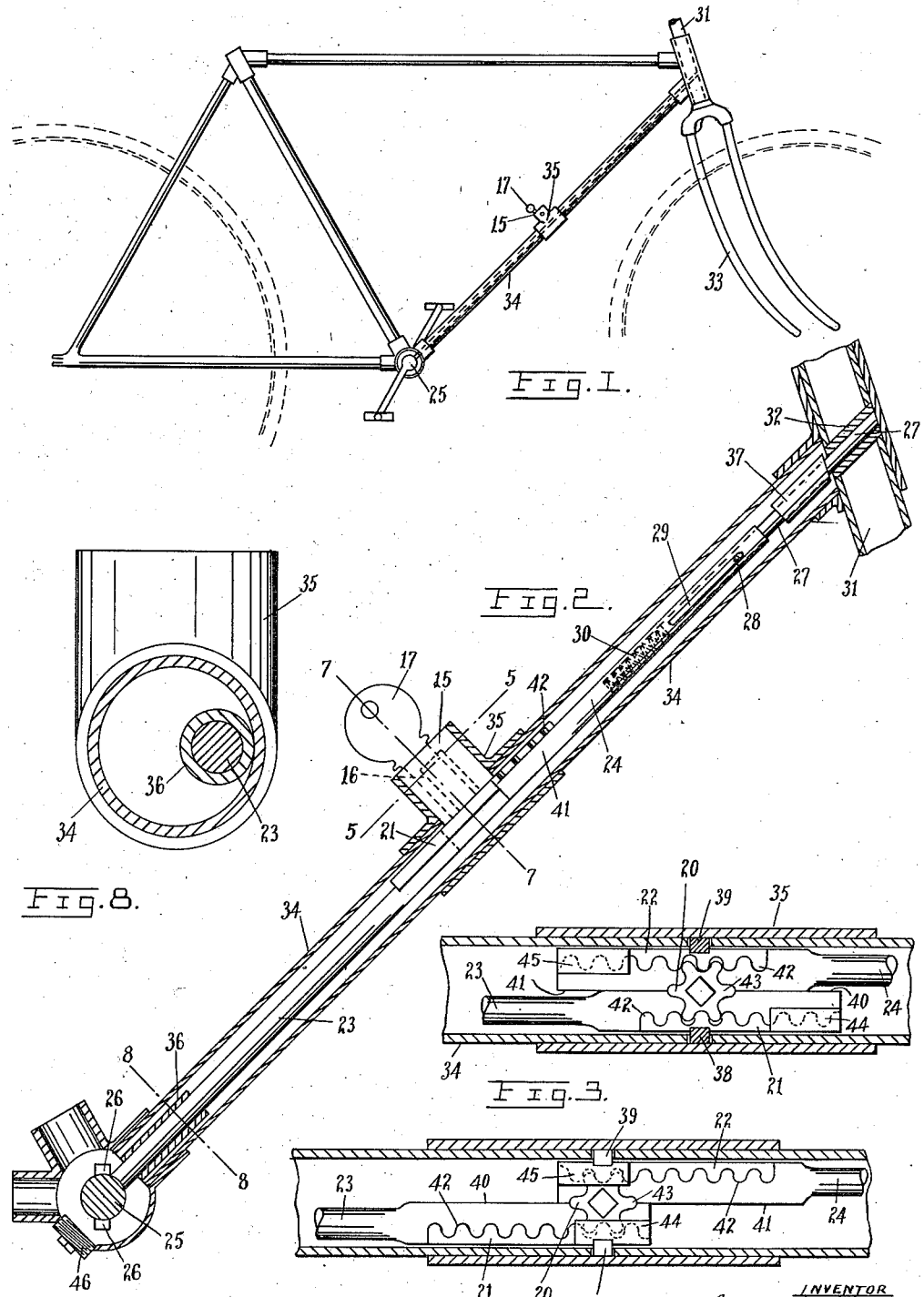

Sept. 22, 1936.  I. HERSHBAIN  2,055,149
BICYCLE LOCK
Filed July 9, 1935  2 Sheets-Sheet 2
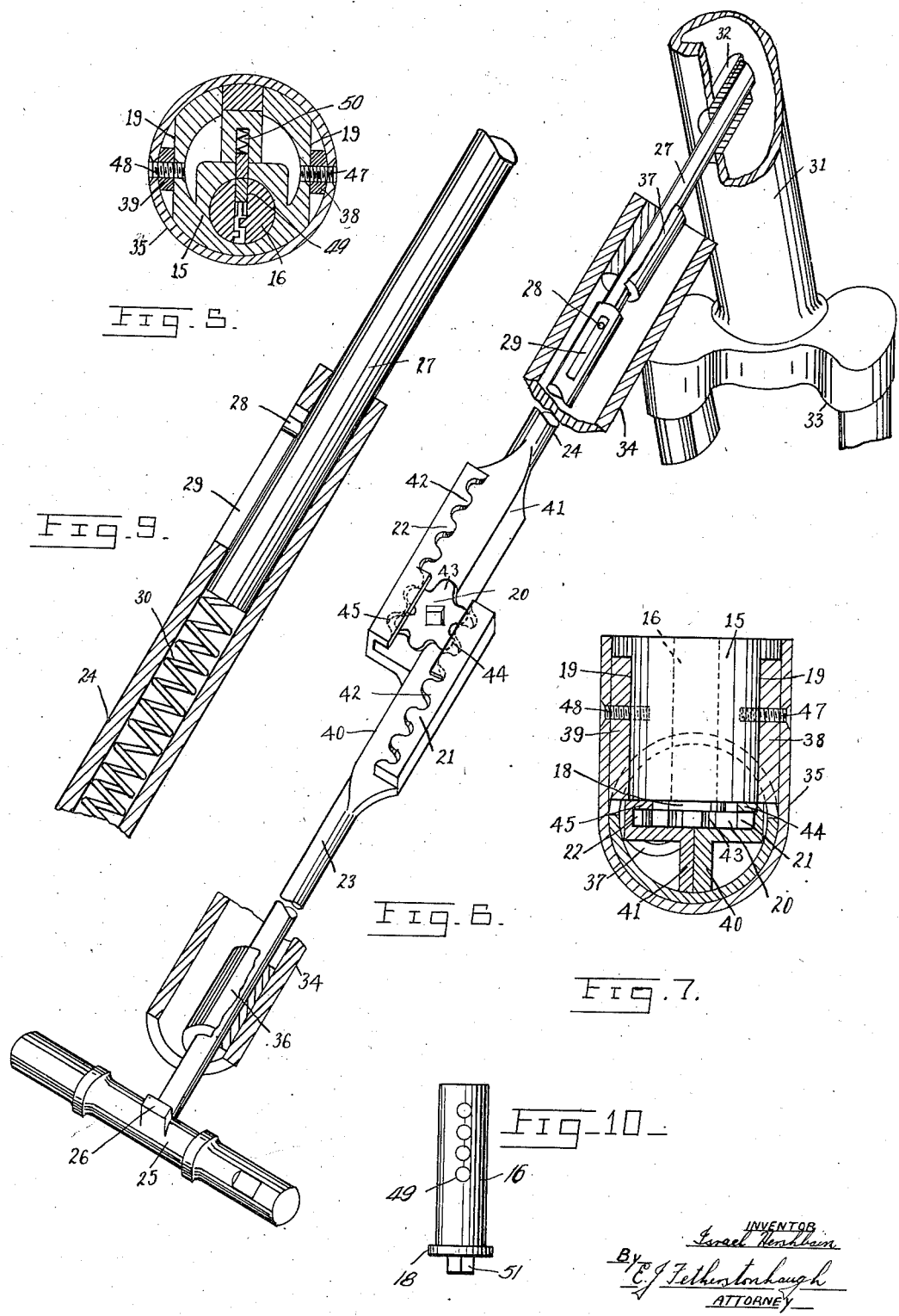

Patented Sept. 22, 1936

2,055,149

UNITED STATES PATENT OFFICE 2,055,149

BICYCLE LOCK

Israel Hershbain, Montreal, Quebec, Canada

Application July 9, 1935, Serial No. 30,530
18 Claims. (Cl. 208—137)

The invention relates to a bicycle lock, as described in the present specification and illustrated in the accompanying drawings that form part of the same.

The invention consists essentially in the direct connection of the lock bolts with a rotating part of the driving mechanism and the pivot mechanism and the safeguarding members incidental to the operations as pointed out in the claims for novelty following a description in detail of the parts and operation.

The objects of the invention are to eliminate the ready thefts of bicycles temporarily parked and to definitely establish the ownership of a bicycle for all occasions, so that the safety of the wheel is manifested to the guardians of the law through the possession of the individual keys or the information furnished in regard to the key and lock number; to establish a relationship between the lock against the rotation of a driving or a driven wheel and the king pin pivot as hereinbefore mentioned; to insure safety from felonious tampering with the parts and to simplify the construction in order to avoid prohibitive costs in production, and generally to provide a locking device readily operable and free from complications.

In the drawings, Figure 1 is a side elevational view of a conventional bicycle frame showing the T-outlet in one of the trusses.

Figure 2 is a longitudinal sectional view of the truss showing a lock therein and the connections to the steering post sleeve and hub sleeve.

Figure 3 is an enlarged plan view showing the rack and gear mechanism in the unlocked position.

Figure 4 is a plan view showing the rack and gear mechanism in the locked position.

Figure 5 is a cross sectional view on the line 5—5 in Figure 2.

Figure 6 is a perspective view of the lock mechanism showing the truss bar broken away.

Figure 7 is a cross sectional view on the line 7—7 in Figure 2.

Figure 8 is a cross sectional view on the line 8—8 in Figure 2.

Figure 9 is a fragmentary detail of the latch bolts shown in Figure 2.

Figure 10 is an elevation of the lock spindle with the gear 20 removed from its end.

Like numerals of reference indicate corresponding parts in the various figures.

Referring to the drawings, the lock, indicated by the numeral 15 is of a standard cylinder type, having the barrel 16 operated by the key 17 and the gear mounting 18 at the inner end terminating in a squared spindle 51. This key is formed to pass and repass certain wards 49 in the barrel or cylinder, and to engage others, against the pressure of the springs 50.

The only difference from the conventional type of cylindrical lock is the flattened sides 19 and the gear 20, carried at the end of the barrel 16, and secured to the squared spindle 51 of the mounting 18, this gear 20 being part of a rack and gear mechanism formed of the racks 21 and 22, these racks constituting in the extensions 23 and 24, the bolts of the lock, the rack being slidable and reciprocally operated by the gear 20.

The bolt 23 in its most extended position reaches the driven axle or crank shaft 25 and there is in the way of the stop 26, which usually projects from either side of the axle, and the bolt 24 extends to a latch rod 27 spring held within the bolt, which is hollow at the end to receive it, this latch having a pin therefrom sliding in the slot 29 and held to its outer position by the spring 30.

The latch rod, which constitutes the gripping part of the bolt 24 extends outwardly to engage the steering post 31, the bushing 32 being inserted in this post to receive the latch rod and rigidly secured therein to one side of the center in order to throw the fork and consequently the wheel of the bicycle out of alignment with the rear wheel of the bicycle, these wheels being indicated by dotted lines.

The lock mechanism described, is introduced into the truss bar 34, that is to say, the bar extending from the hub sleeve to the steering post sleeve and constituting a standard part of the bicycle frame and having the T-outlet 35 intermediate of its length.

The bushing 36 rigidly secured within this truss bar 34 at the lower end forms a guide and support for the bolt 23, while the bushing 37 at the upper end of this bar and therewithin forms a guide and support for the sliding of the latch rod 27.

The T-outlet 35 on either side is formed with the flats 38 and 39, which are intended to avoid any possibility of rotation of the lock 15, held by the screws 47 and 48.

The racks 21 and 22 are within the truss bar and coact with the gear 20 at the end of the barrel 16 and have the abutting flanges 40 and 41 standing on the inner wall surface of the tube and bringing the teeth 42 of the racks into mesh with the teeth 43 of the gear, these teeth being held in constant engagement by the tubular wall of the truss bar.

The lugs 44 and 45 are inturned pieces at the extremities of the rack and these in the locked position of the bolts engage the upper side of the gear 20 and lock that gear and the lock itself into place at the T-outlet.

The security offered by this construction in so far as the fastening of the lock and the T-outlet is concerned, should be further emphasized. This fastening is not only concerned with rivets or screws it is connected to the actual racks and bolts when the bicycle is parked and locked, which is certainly a great advantage over any lock mechanism heretofore known.

The lugs forming the flats 38 and 39 extend downwardly into the T-outlet and are secured in any suitable way and actually maintain the racks in an easy running position.

In the operation of this invention, the bicycle rider parks his wheel and takes out his key and turns the cylinder of the lock, and thereby operates the gear at its inner end which meshes with the racks and sends the bolt 23 in one direction and the bolt 24 in the other direction.

The bolt 23 comes in contact with the crank shaft or axle between the stops 26, thereby locking the crank from rotation.

This lock is very serviceable and without any complications. There is no possibility whatsoever of the driving member being forced into rotation, as the bolt is firmly against the axle and there is no possibility of such short lugs being snapped off.

Coincidently with the shooting of the bolt 23, the bolt 24 through the latch rod reaches the exterior wall surface of the pivoted post of the fork, and this post is turned until the latch shoots in and holds the wheel of the machine out of alignment with the rear wheel of the machine, which means that the bicycle would actually have to be carried away and could not even be wheeled away, without continuously traversing a circular path, in other words, both ends of the machine are locked, as the crank cannot move without the turning of the axle, its driving member and the front wheel can only move in an endless direction, which is the desired object of all locking mechanisms, and this mechanism can be operated with ease and at the same time be perfectly safe in so far as tampering with the lock is concerned, for the best type of lock can always be used, at little or no extra expense, so it is quite obvious how the invention works and the advantages have been set forth in the earlier part of this description.

The installation of this lock mechanism is preferably done through the hub sleeve which is formed of the threaded opening 46 at the underside, that is to say, the parts are assembled by first introducing one rack and bolt extension and then introducing another rack and bolt extension, these two racks being separated at the introduction of the gear on the bottom of the lock, the latter being inserted in the T-outlet. Then, following the introduction of these parts, the screw plug closes the opening into the hub sleeve, and then the driving mechanism is inserted in the sleeve, which absolutely blocks access to the locked parts, so to get at the lock mechanism practically the whole bicycle would have to be dismantled.

Then in regard to the latch mechanism, the latch rod in finding its place pockets itself in the bushing 32, which eliminates any chance whatsoever of inserting a tool or other article to force this latch back, in fact all the safeguards possible are taken to avoid tampering with the mechanism and it may be said without any fear of contradiction that to reach this lock mechanism in order to release the bolts after being shot cannot be accomplished unless the bicycle is actually carried away to a shop and taken apart, which is practically impossible. Therefore the safety of the bicycle is assured, in so far as parking is concerned.

What I claim is:—

1. In a bicycle lock, a tubular frame and driven crank shaft, a suitable stop lug on said shaft, a pair of locking bolts having toothed racks and a lock barrel having wards and a rotatable spindle carrying a toothed wheel operating said racks into engagement with said stop and a pivoted frame bar respectively.

2. A lock comprising a barrel having a key passage and rotatable spindle carrying a gear at the end thereof, a member slidably mounted and coacting with said gear and a frame having bearings for said member and enclosing a driven member engaged and locked by said slidable member.

3. In a bicycle lock, a barrel in cylindrical form having a key passage, wards mounted in said barrel, a spindle extending from said barrel, a toothed wheel fixedly mounted on said spindle, a pair of locking bolts having racks meshing with said wheel and operated thereby and a frame of tubular form enclosing said parts and a rotatable driving member held from operation by one of said bolts.

4. In a bicycle lock, a gear mechanism having locking bolts respectively extending to the steering gear pivot and driving member, a frame enclosing said mechanism and having an outlet therefrom and a lock mechanism carrying the operating gear of said gear mechanism and stopping said outlet.

5. A vehicle lock, comprising a pair of racks and gear mechanism suitably encased and communicating with a lock outlet and having a bolt extended from one of said racks adapted to engage a rotary member and a spring bolt carried by the other rack, adapted to engage a steering post, and a lock mechanism stopping said outlet.

6. In a bicycle lock, a tubular frame having a truss member connecting a hub sleeve and a steering post sleeve, a steering post pivoted in said post sleeve, a crank shaft within said hub sleeve and having a stop projecting therefrom, a rack and gear mechanism slidably supported in said truss and having a bolt from one rack sliding to and from said stop and a bolt from the other rack extended to form a spring latch engaging in said post in its outward movement and a lock introduced in said truss and carrying the gear engaging said racks.

7. In a bicycle lock, a tubular frame having a truss member connecting a crank hanger and a steering post sleeve, a steering post pivoted in said post sleeve having a sleeve bushing in alignment with the end of said truss member, a crank shaft within said hub sleeve and having a stop projecting therefrom, a rack and gear mechanism slidably supported in said truss and having a bolt from one rack sliding to and from said stop and a bolt from the other forming a spring latch adapted to engage in the sleeve bushing of said steering post and a lock introduced in said truss and carrying the gear engaging said racks.

8. In a bicycle lock, a tubular frame having a truss member connecting a crank hanger and a steering post sleeve, a steering post pivoted in said post sleeve having a sleeve bushing in alignment centrally with the end of said truss member and radially offset from the center line of the bicycle, a crank shaft within said hub sleeve and having a stop projecting therefrom, a rack and gear mechanism slidably supported in said truss and having a bolt from one rack sliding to and from said stop and a bolt from the other forming a spring latch adapted to engage in the sleeve bushing of said steering post when the post is turned off center, and a lock introduced in said truss and carrying the gear engaging said racks.

9. In a bicycle lock, a tubular frame having a truss member connecting a crank hanger and a steering post sleeve, a steering post pivoted in said post sleeve, a crank shaft within said hub sleeve and having a series of stops projecting therefrom said stops in alignment with the open end of said truss member, a rack and gear mechanism slidably supported in said truss and having a bolt from one rack sliding to and from said crank shaft and engaging between said stops in the locking position, and a bolt from the other forming a spring latch engaging said post in its outward movement, and a lock introduced in said truss and carrying the gear engaging said racks.

10. In a bicycle lock, a tubular frame having a truss member connecting a crank hanger and a steering post sleeve, a steering post pivoted in said post sleeve, a crank shaft within said hub sleeve and having a stop projecting therefrom, end bearing sleeves attached to the inside surface of said truss, a rack and gear mechanism slidably supported in said truss and having a bolt slidable in one of said bearing sleeves to and from said stop and a bolt from the other rack slidable in the other bearing sleeve and forming a spring latch engaging said post in its outward movement, and a lock introduced in said truss and carrying the gear engaging said racks.

11. In a bicycle lock, a tubular frame having a truss member connecting a crank hanger and a steering post sleeve, a steering post pivoted in said post sleeve, a crank shaft within said hub sleeve and having a stop projecting therefrom, a rack and gear mechanism slidably supported in said truss, comprising a pair of rack members having vertical contracting sliding faces and horizontal surfaces carrying the racks, a bolt extending from one of said rack members adapted to engage with said crank shaft stop and a bolt from the other forming a spring latch engaging said post and a lock introduced in said truss and carrying the gear engaging said rack members adapted to reciprocate the bolts in opposite directions to engage and lock the said crank shaft and said steering post.

12. In a bicycle lock, a tubular frame having a truss member connecting a crank hanger and a steering post sleeve, a steering post pivoted in said post sleeve, a crank shaft within said hub sleeve and having a stop projecting therefrom, a rack and gear mechanism slidably supported in said truss, comprising a pair of rack members having vertical contracting sliding faces and horizontal surfaces carrying the racks, a bolt extending from one of said rack members adapted to engage with said crank shaft stop and a bolt from the other recessed at its outer end to receive an extension bolt, a slot in said bolt communicating with said recess, a spring introduced in said recess, an extension bolt introduced into said recess against said spring and having a pin projection adapted to engage in said slot and a lock introduced in said truss and carrying the gear engaging said racks.

13. In a bicycle lock, a tubular frame having a truss member, connecting a crank hanger and a steering post sleeve, and having a portion of its upper surface cut away midway of its length, a T-piece introduced about said truss member having its branch outlet facing said cutaway portion, side lugs in said branch outlet forming flats, a steering post pivoted in said post sleeve, a crank shaft within said hub sleeve and having a stop projecting therefrom, a rack and gear mechanism slidably supported in said truss and held from rotary movement by said lugs, a bolt from said rack sliding to and from said stop and a bolt from the other forming a spring latch engaging said post and a lock introduced in said branch outlet and carrying the gear engaging said racks.

14. In a bicycle lock, a tubular frame having a truss member, connecting a crank hanger and a steering post sleeve, and having a portion of its upper surface cut away midway of its length, a T-piece introduced about said truss member having its branch outlet facing said cutaway portion, side lugs in said branch outlet forming flats, a steering post pivoted in said post sleeve, a crank shaft within said hub sleeve and having a stop projecting therefrom, a rack and gear mechanism slidably supported in said truss and held from rotary movement by said lugs, a bolt from said rack sliding to and from said stop and a bolt from the other forming a spring latch engaging said post and a lock casing introduced in said branch outlet having flattened side engaging the flat surfaces of the said lugs and a key barrel within said casing carrying at its inner end the gear engaging said racks and adapted to reciprocate the racks on rotation of the key barrel.

15. In a bicycle lock, a tubular frame having a truss member connecting a crank hanger and a steering post sleeve, a steering post pivoted in said post sleeve, a crank shaft within said hub sleeve and having a stop projecting therefrom, a rack and gear mechanism slidably supported in said truss comprising a pair of rack members having horizontal surfaces carrying racks, upper horizontal flanges projecting inwardly at the inner ends of the racks and covering the end teeth thereof, a bolt extending from one of said rack members slidable to and from said stop and a bolt from the other rack member forming a spring latch engaging said post in its outward movement, a lock introduced in said truss, and a gear carried by said lock and engaging said racks adapted to bring on rotation the said flanges into alignment over said gear to prevent withdrawal of the lock and to lock the steering post and crank shaft.

16. In a bicycle lock, a casing having a T-outlet intermediate of its length, and at one end firmly secured to the crank hanger and at the other end to the steering post and communicating with both sleeves and having an access opening in the hub sleeve and a screw plug therefor, a pair of racks operating in said casing and a lock in said T-outlet carrying the gear coacting with said racks in shooting the bolts and a key operating in the lock for driving the gear, said racks having locking lugs gripping said gear in the shot position of the bolts, a driven axle having stop lugs therefrom and enclosed in said hub sleeve and engaged by one of said shot bolts, and a bushing in said steering post sleeve receiving the other shot bolt and a spring resiliently holding and forming a shot bolt received in the said bushing.

17. A lock comprising a cylinder and a barrel having a key passage, a gear on the end of said barrel, and a hollow frame member intersected by said cylinder and having a bolt slidable therein and connected at one end to said gear and engaging with its other end a member to be locked when the barrel and gear are rotated.

18. A lock comprising a cylinder and a barrel having a key passage, a gear on the end of said barrel, a hollow frame member intersected by said cylinder and having a spring bolt slidably mounted therein and connected at one end to said gear, and a movable member having an aperture therein adapted to receive the other end of said bolt and to be withdrawn therefrom on rotation of the barrel and gear.

ISRAEL HERSHBAIN.